United States Patent
Yamabe

(10) Patent No.: US 11,976,191 B2
(45) Date of Patent: *May 7, 2024

(54) GOLF BALL

(71) Applicant: BRIDGESTONE SPORTS CO., LTD., Tokyo (JP)

(72) Inventor: Masahiro Yamabe, Saitamaken (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 27 days.

This patent is subject to a terminal disclaimer.

(21) Appl. No.: 17/830,910

(22) Filed: Jun. 2, 2022

(65) Prior Publication Data

US 2022/0389211 A1 Dec. 8, 2022

(30) Foreign Application Priority Data

Jun. 8, 2021 (JP) ................................ 2021-095656

(51) Int. Cl.
| | | |
|---|---|---|
| *A63B 37/06* | (2006.01) | |
| *A63B 37/00* | (2006.01) | |
| *C08L 53/02* | (2006.01) | |
| *C08L 67/00* | (2006.01) | |
| *C08L 75/02* | (2006.01) | |
| *C08L 75/04* | (2006.01) | |

(52) U.S. Cl.
CPC .......... *C08L 53/02* (2013.01); *A63B 37/0027* (2013.01); *C08L 67/00* (2013.01); *C08L 75/02* (2013.01); *C08L 75/04* (2013.01)

(58) Field of Classification Search
CPC .......... A63B 37/0063; A63B 37/0023
See application file for complete search history.

(56) References Cited

U.S. PATENT DOCUMENTS

| | | | |
|---|---|---|---|
| 6,319,152 B1 | 11/2001 | Takesue et al. | |
| 2010/0298070 A1* | 11/2010 | Higuchi | A63B 37/0012 473/384 |
| 2013/0131236 A1* | 5/2013 | Ozawa | C08K 5/09 524/106 |
| 2013/0157143 A1* | 6/2013 | Hoshiba | H01M 4/621 429/211 |
| 2014/0100059 A1* | 4/2014 | Kimura | A63B 37/0064 473/377 |
| 2020/0406104 A1 | 12/2020 | Yamabe et al. | |
| 2023/0138800 A1* | 5/2023 | Kimura | A63B 37/0039 473/374 |

FOREIGN PATENT DOCUMENTS

| | | |
|---|---|---|
| JP | 11-009721 A | 1/1999 |
| JP | 2021-003451 A | 1/2021 |

OTHER PUBLICATIONS

Asahi Chemical Data Sheet S.O.E. S1611 (Year: 2020).*

* cited by examiner

*Primary Examiner* — Raeann Gorden

(74) *Attorney, Agent, or Firm* — Sughrue Mion, PLLC

(57) ABSTRACT

In a golf ball having a core of at least one layer and a cover of at least one layer encasing the core, at least one layer of the cover is formed of a resin composition which includes (I) a polyurethane or a polyurea, (II) a thermoplastic polyester elastomer and (III) an aromatic vinyl elastomer. The thermoplastic polyester elastomer serving as component (II) and the aromatic vinyl elastomer serving component (III) have specific respective contents and properties, including Shore D hardnesses and rebound resiliences. The golf ball has an excellent controllability on approach shots without a loss of distance on driver shots. In addition, the scuff resistance and moldability are good.

7 Claims, No Drawings

GOLF BALL

CROSS-REFERENCE TO RELATED APPLICATION

This non-provisional application claims priority under 35 U.S.C. § 119(a) on Patent Application No. 2021-095656 filed in Japan on Jun. 8, 2021, the entire contents of which are hereby incorporated by reference.

TECHNICAL FIELD

The present invention relates to golf ball having a core of at least one layer and a cover of at least one layer.

BACKGROUND ART

The property most desired in a golf ball is an increased distance, but other desirable properties include the ability for the ball to stop well on approach shots and a good scuff resistance. Many golf balls have hitherto been developed that exhibit a good flight performance on shots with a driver and are suitably receptive to backspin on approach shots. Recently, in golf balls for professional golfers and skilled amateurs, urethane resin materials are often used in place of ionomer resin materials.

A number of polymer blend-type cover materials obtained by using a urethane resin as the base resin and mixing other resins therein have been described in the art. For example, to improve the scuff resistance of the cover material, JP-A H11-9721 discloses the use of a blend composed of a thermoplastic polyurethane and a styrene-based block copolymer as the base resin of the cover material. However, covers made of this blend are inadequate in terms of their rebound resilience and scuff resistance.

JP-A 2021-3451 discloses a golf ball which, owing to the use as the cover material of a resin composition obtained by blending an aromatic vinyl elastomer with a polyurethane resin material, has an excellent controllability on approach shots without losing distance on driver shots and moreover is able to maintain a good scuff resistance. However, even this golf ball is inadequate in terms of its spin rate on approach shots, and so there exists a desire to further increase the spin rate and achieve an even higher controllability while maintaining a good scuff resistance and moldability.

SUMMARY OF THE INVENTION

It is therefore an object of the present invention to provide a golf ball which, compared with prior-art golf balls having a urethane cover, has a high controllability on approach shots and moreover has a good scuff resistance and moldability.

I have discovered that certain remarkable effects are achieved by using, as the cover material in a golf ball having a core and a cover, a polymer blend of resin materials in which the base resin is a polyurethane or polyurea and which includes both a specific low-hardness thermoplastic polyester elastomer (component (II) of the invention) having a good compatibility with the polyurethane or polyurea and a specific aromatic vinyl elastomer (component (III) of the invention) likewise having a good compatibility with the polyurethane or polyurea. Namely, when a golf ball in which a molded form of the resin composition composed of these ingredients serves as the cover is produced, the resulting golf ball has an excellent controllability on approach shots and also has a good scuff resistance and moldability. That is, in this invention, by using together the specific above thermoplastic polyester elastomer and the specific above aromatic vinyl elastomer as added resins in a resin composition containing polyurethane or polyurea as the base resin, the compatibility with the polyurethane or polyurea is good and both a low hardness and at least a given degree of rebound resilience are imparted to the resin composition, enabling a golf ball endowed with a satisfactory controllability on approach shots, scuff resistance and moldability to be obtained.

Accordingly, the present invention provides a golf ball having a rubber core of at least one layer and a cover of at least one layer encasing the core, wherein at least one layer of the cover is formed of a resin composition which includes (I) a polyurethane or a polyurea, (II) a thermoplastic polyester elastomer and (III) an aromatic vinyl elastomer. The thermoplastic polyester elastomer serving as component (II) has a Shore D hardness of 45 or less, a rebound resilience of 74% or less, a melt viscosity at 200° C. and a shear rate of 243 sec$^{-1}$ of $1.5 \times 10^4$ dPa·s or less, and is included in an amount of 20 parts by weight or less per 100 parts by weight of component (I). The aromatic vinyl elastomer serving as component (III) has a Shore D hardness of 30 or less and a rebound resilience of 30% or less, and is included in an amount of 20 parts by weight or less per 100 parts by weight of component (I).

In a preferred embodiment of the golf ball of the invention, component (II) is included in an amount of 15 parts by weight or less per 100 parts by weight of component (I).

In another preferred embodiment of the inventive golf ball, component (III) is included in an amount of 15 parts by weight or less per 100 parts by weight of component (I).

In yet another preferred embodiment, component (III) is a hydrogenated aromatic vinyl elastomer.

In still another preferred embodiment, component (III) is an elastomer obtained by hydrogenating a polymer composed of polymer blocks made up primarily of an aromatic vinyl compound and random copolymer blocks made up of an aromatic vinyl compound and a conjugated diene compound.

In a further preferred embodiment, component (III) is a hydrogenated aromatic vinyl elastomer obtained by hydrogenating a polymer which is composed of polymer blocks made up of styrene and random copolymer blocks made up of styrene and butadiene, the polymer blocks made up of styrene being located at both ends of the polymer and the random copolymer blocks being located in between.

Advantageous Effects of the Invention

Compared with prior-art golf balls having a urethane cover, the golf ball of the invention has an excellent controllability on approach shots and also retains a good scuff resistance and moldability.

DESCRIPTION OF THE PREFERRED EMBODIMENTS

The objects, features and advantages of the invention will become more apparent from the following detailed description.

The golf ball of the invention is a golf ball having a core of at least one layer, which core is encased by a cover of at least one layer, namely a cover of one layer or a plurality of layers.

The core may be formed using a known rubber material as the base material. A known base rubber such as natural rubber or synthetic rubber may be used as the base rubber. More specifically, it is recommended that polybutadiene, especially cis-1,4-polybutadiene having a cis structure content of at least 40%, be chiefly used. If desired, natural rubber, polyisoprene rubber, styrene-butadiene rubber or the like may be used together with the foregoing polybutadiene in the base rubber.

The polybutadiene may be synthesized with a metal catalyst, such as a neodymium or other rare-earth catalyst, a cobalt catalyst or a nickel catalyst.

Co-crosslinking agents such as unsaturated carboxylic acids and metal salts thereof, inorganic fillers such as zinc oxide, barium sulfate and calcium carbonate, and organic peroxides such as dicumyl peroxide and 1,1-bis(t-butylperoxy)cyclohexane may be included in the base rubber. If necessary, commercial antioxidants and the like may be suitably added.

The core may be produced by vulcanizing/curing the rubber composition containing the above ingredients. For example, production may be carried out by kneading the composition using a mixer such as a Banbury mixer or a roll mill, compression molding or injection molding the kneaded composition using a core mold, and curing the molded body by suitably heating it at a temperature sufficient for the organic peroxide and the co-crosslinking agent to act, i.e., between 100° C. and 200° C., preferably between 140° C. and 180° C., for a period of 10 to 40 minutes.

In the golf ball of the invention, the core is encased with a cover of one layer or a plurality of layers. Such a golf ball is exemplified by golf balls having a core and a one-layer cover, and golf balls having a core, an intermediate layer encasing the core and an outermost layer encasing the intermediate layer.

In this invention, the resin material making up at least one layer of the cover is formed of a resin composition containing components (I) to (III) below:
(I) a polyurethane or a polyurea,
(II) a thermoplastic polyester elastomer, and
(III) an aromatic vinyl elastomer.

(I) Polyurethane or Polyurea

The polyurethane or polyurea is a substance that is capable of serving as the base resin of the above cover material (resin composition). The polyurethane (I-a) or polyurea (I-b) used as this component is described in detail below.

(I-a) Polyurethane

The polyurethane has a structure which includes soft segments composed of a polymeric polyol (polymeric glycol) that is a long-chain polyol, and hard segments composed of a chain extender and a polyisocyanate. Here, the polymeric polyol serving as a starting material may be any that has hitherto been used in the art relating to polyurethane materials, and is not particularly limited. It is exemplified by polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. Specific examples of polyester polyols that may be used include adipate-type polyols such as polyethylene adipate glycol, polypropylene adipate glycol, polybutadiene adipate glycol and polyhexamethylene adipate glycol; and lactone-type polyols such as polycaprolactone polyol. Examples of polyether polyols include poly(ethylene glycol), poly(propylene glycol), poly(tetramethylene glycol) and poly(methyltetramethylene glycol). These polyols may be used singly, or two or more may be used in combination.

It is preferable to use a polyether polyol as the polymeric polyol.

The long-chain polyol has a number-average molecular weight that is preferably in the range of 1,000 to 5,000. By using a long-chain polyol having a number-average molecular weight in this range, golf balls made with a polyurethane composition that have excellent properties, including a good rebound and good productivity, can be reliably obtained. The number-average molecular weight of the long-chain polyol is more preferably in the range of 1,500 to 4,000, and even more preferably in the range of 1,700 to 3,500.

Here and below, "number-average molecular weight" refers to the number-average molecular weight calculated based on the hydroxyl value measured in accordance with JIS-K1557.

The chain extender is not particularly limited; any chain extender that has hitherto been employed in the art relating to polyurethanes may be suitably used. In this invention, low-molecular-weight compounds with a molecular weight of 2,000 or less which have on the molecule two or more active hydrogen atoms capable of reacting with isocyanate groups may be used. Of these, preferred use can be made of aliphatic diols having from 2 to 12 carbon atoms. Specific examples include 1,4-butylene glycol, 1,2-ethylene glycol, 1,3-butanediol, 1,6-hexanediol and 2,2-dimethyl-1,3-propanediol. The use of 1,4-butylene glycol is especially preferred.

Any polyisocyanate hitherto employed in the art relating to polyurethanes may be suitably used without particular limitation as the polyisocyanate. For example, use can be made of one or more selected from the group consisting of 4,4'-diphenylmethane diisocyanate, 2,4-toluene diisocyanate, 2,6-toluene diisocyanate, p-phenylene diisocyanate, xylylene diisocyanate, 1,5-naphthylene diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate, 1,4-bis(isocyanatomethyl)cyclohexane and dimer acid diisocyanate. However, depending on the type of isocyanate, crosslinking reactions during injection molding may be difficult to control.

The ratio of active hydrogen atoms to isocyanate groups in the polyurethane-forming reaction may be suitably adjusted within a preferred range. Specifically, in preparing a polyurethane by reacting the above long-chain polyol, polyisocyanate and chain extender, it is preferable to use the respective components in proportions such that the amount of isocyanate groups included in the polyisocyanate per mole of active hydrogen atoms on the long-chain polyol and the chain extender is from 0.95 to 1.05 moles.

The method for preparing the polyurethane is not particularly limited. Preparation using the long-chain polyol, chain extender and polyisocyanate may be carried out by either a prepolymer process or a one-shot process via a known urethane-forming reaction. Of these, melt polymerization in the substantial absence of solvent is preferred. Production by continuous melt polymerization using a multiple screw extruder is especially preferred.

It is preferable to use a thermoplastic polyurethane material as the polyurethane, with an ether-based thermoplastic polyurethane material being especially preferred. The thermoplastic polyurethane material used may be a commercial product, illustrative examples of which include those available under the trade name PANDEX from DIC Covestro Polymer, Ltd., and those available under the trade name RESAMINE from Dainichiseika Color & Chemicals Mfg. Co., Ltd.

(I-b) Polyurea

The polyurea is a resin composition composed primarily of urea linkages formed by reacting (i) an isocyanate with (ii) an amine-terminated compound. This resin composition is described in detail below.

(i) Isocyanate

The isocyanate is not particularly limited. Any isocyanate used in the prior art relating to polyurethanes may be suitably used here. Use may be made of isocyanates similar to those mentioned above in connection with the polyurethane material.

(ii) Amine-Terminated Compound

An amine-terminated compound is a compound having an amino group at the end of the molecular chain. In this invention, the long-chain polyamines and/or amine curing agents shown below may be used.

The long-chain polyamine is an amine compound which has on the molecule at least two amino groups capable of reacting with isocyanate groups and which has a number-average molecular weight of from 1,000 to 5,000. In this invention, the number-average molecular weight is more preferably from 1,500 to 4,000, and even more preferably from 1,900 to 3,000. Examples of such long-chain polyamines include, but are not limited to, amine-terminated hydrocarbons, amine-terminated polyethers, amine-terminated polyesters, amine-terminated polycarbonates, amine-terminated polycaprolactones, and mixtures thereof. These long-chain polyamines may be used singly, or two or more may be used in combination.

The amine curing agent is an amine compound which has on the molecule at least two amino groups capable of reacting with isocyanate groups and which has a number-average molecular weight of less than 1,000. In this invention, the number-average molecular weight is more preferably less than 800, and even more preferably less than 600.

Specific examples of such amine curing agents include, but are not limited to, ethylenediamine, hexamethylenediamine, 1-methyl-2,6-cyclohexyldiamine, tetrahydroxypropylene ethylenediamine, 2,2,4- and 2,4,4-trimethyl-1,6-hexanediamine, 4,4'-bis(sec-butylamino)dicyclohexylmethane, 1,4-bis(sec-butylamino)cyclohexane, 1,2-bis(sec-butylamino)cyclohexane, derivatives of 4,4'-bis(sec-butylamino)dicyclohexylmethane, 4,4'-dicyclohexylmethanediamine, 1,4-cyclohexane bis(methylamine), 1,3-cyclohexane bis(methylamine), diethylene glycol di(aminopropyl) ether, 2-methylpentamethylenediamine, diaminocyclohexane, diethylenetriamine, triethylenetetramine, tetraethylenepentamine, propylenediamine, 1,3-diaminopropane, dimethylaminopropylamine, diethylaminopropylamine, dipropylenetriamine, imidobis(propylamine), monoethanolamine, diethanolamine, triethanolamine, monoisopropanolamine, diisopropanolamine, isophoronediamine, 4,4'-methylenebis (2-chloroaniline), 3,5-dimethylthio-2,4-toluenediamine, 3,5-dimethylthio-2,6-toluenediamine, 3,5-diethylthio-2,4-toluenediamine, 3,5-diethylthio-2,6-toluenediamine, 4,4'-bis (sec-butylamino)diphenylmethane and derivatives thereof, 1,4-bis(sec-butylamino)benzene, 1,2-bis(sec-butylamino) benzene, N,N'-dialkylaminodiphenylmethane, N,N,N',N'-tetrakis(2-hydroxypropyl)ethylenediamine, trimethylene glycol di-p-aminobenzoate, polytetramethylene oxide di-p-aminobenzoate, 4,4'-methylenebis(3-chloro-2,6-diethyleneaniline), 4,4'-methylenebis(2,6-diethylaniline), m-phenylenediamine, p-phenylenediamine and mixtures thereof. These amine curing agents may be used singly or two or more may be used in combination.

(iii) Polyol

Although not an essential ingredient, in addition to above components (i) and (ii), a polyol may also be included in the polyurea. The polyol is not particularly limited, but is preferably one that has hitherto been used in the art relating to polyurethanes. Specific examples include the long-chain polyols and/or polyol curing agents mentioned below.

The long-chain polyol may be any that has hitherto been used in the art relating to polyurethanes. Examples include, but are not limited to, polyester polyols, polyether polyols, polycarbonate polyols, polyester polycarbonate polyols, polyolefin-based polyols, conjugated diene polymer-based polyols, castor oil-based polyols, silicone-based polyols and vinyl polymer-based polyols. These long-chain polyols may be used singly or two or more may be used in combination.

The long-chain polyol has a number-average molecular weight of preferably from 1,000 to 5,000, and more preferably from 1,700 to 3,500. In this number-average molecular weight range, an even better resilience and productivity are obtained.

The polyol curing agent is preferably one that has hitherto been used in the art relating to polyurethanes, but is not subject to any particular limitation. In this invention, use may be made of a low-molecular-weight compound having on the molecule at least two active hydrogen atoms capable of reacting with isocyanate groups and having a molecular weight of less than 1,000. Of these, the use of aliphatic diols having from 2 to 12 carbon atoms is preferred. Specific examples include 1,4-butylene glycol, 1,2-ethylene glycol, 1,3-butanediol, 1,6-hexanediol and 2,2-dimethyl-1,3-propanediol. The use of 1,4-butylene glycol is especially preferred. The polyol curing agent has a number-average molecular weight of preferably less than 800, and more preferably less than 600.

A known method may be used to produce the polyurea. A prepolymer process, a one-shot process or some other known method may be suitably selected for this purpose.

Component (I) has a material hardness on the Shore D hardness scale which, from the standpoint of the spin properties and scuff resistance achieved by the golf ball, is preferably 52 or less, more preferably 50 or less, and even more preferably 48 or less. From the standpoint of the moldability, the lower limit in the material hardness on the Shore D scale is preferably at least 38, and more preferably at least 40.

Component (I) has a rebound resilience which, from the standpoint of enhancing the spin rate on approach shots, is preferably at least 55%, more preferably at least 57%, and even more preferably at least 59%. The rebound resilience is measured in accordance with JIS-K 6255: 2013.

Component (I) serves as the base resin of the resin composition. To fully impart the scuff resistance of the urethane resin, it accounts for at least 50 wt %, preferably at least 60 wt %, more preferably at least 70 wt %, even more preferably at least 80 wt %, and most preferably at least 90 wt %, of the resin composition.

(II) Thermoplastic Polyester Elastomer

The thermoplastic polyester elastomer serving as component (II) is an ingredient which imparts at least a given level of resilience to the resin composition and, along with imparting such resilience, enables the ball to maintain an elevated spin rate at or above a given level on approach shots. Also, the thermoplastic polyester elastomer serving as component (II) has a good compatibility with above component (I) serving as the base resin, the compatibility being better than that of hitherto used thermoplastic polyester elastomers in particular, and so is able to impart the ball with a good scuff resistance. In addition, including the thermoplastic polyester elastomer as an essential ingredient in the resin composition provides the resin composition with at least a given level of melt viscosity, imparting the composition with hardenability after it has been molded. That is, the thermoplastic polyester elastomer suppresses a decline in the viscosity of the overall resin composition due to the softness of component (I) serving as the base resin, thus preventing a decrease in moldability (productivity) and an increase in appearance defects in the molded golf balls and also holding down a rise in production costs owing to an increased cooling time.

The thermoplastic polyester elastomer serving as component (II) is a resin composition made up of (II-a) a polyester block copolymer and (II-b) a rigid resin. Component (II-a) is made up, in turn, of (II-a1) a high-melting crystalline polymer segment and (II-a2) a low-melting polymer segment.

The high-melting crystalline polymer segment (II-a1) within the polyester block copolymer serving as component (II-a) is a polyester made of one or more compound selected from the group consisting of aromatic dicarboxylic acids and ester-forming derivatives thereof and diols and ester-forming derivatives thereof.

Illustrative examples of the aromatic dicarboxylic acids include terephthalic acid, isophthalic acid, phthalic acid, 2,6-naphthalenedicarboxylic acid, 2,7-naphthalenedicarboxylic acid, anthracenedicarboxylic acid, diphenyl-4,4'-dicarboxylic acid, diphenoxyethanedicarboxylic acid, 4,4'-diphenyletherdicarboxylic acid, 5-sulfoisophthalic acid and sodium 3-sulfoisophthalate. In this invention, an aromatic dicarboxylic acid is primarily used. However, where necessary, some of this aromatic dicarboxylic acid may be replaced with an alicyclic dicarboxylic acid such as 1,4-cyclohexanedicarboxylic acid, cyclopentanedicarboxylic acid or 4,4'-dicyclohexyldicarboxylic acid or with an aliphatic dicarboxylic acid such as adipic acid, succinic acid, oxalic acid, sebacic acid, dodecanedioic acid or a dimer acid. Exemplary ester-forming derivatives of dicarboxylic acids include lower alkyl esters, aryl esters, carboxylic acid esters and acid halides of the above dicarboxylic acids.

Next, a diol having a molecular weight of 400 or less may be suitably used as the diol. Specific examples include aliphatic diols such as 1,4-butanediol, ethylene glycol, trimethylene glycol, pentamethylene glycol, hexamethylene glycol, neopentyl glycol and decamethylene glycol; alicyclic diols such as 1,1-cyclohexanedimethanol, 1,4-dicyclohexanedimethanol and tricyclodecanedimethanol; and aromatic diols such as xylylene glycol, bis(p-hydroxy)diphenyl, bis(p-hydroxy)diphenylpropane, 2,2'-bis[4-(2-hydroxyethoxy)phenyl]propane, bis[4-(2-hydroxyethoxy)phenyl]sulfone, 1,1-bis[4-(2-hydroxyethoxy)phenyl]cyclohexane, 4,4'-dihydroxy-p-terphenyl and 4,4'-dihydroxy-p-quaterphenyl. Exemplary ester-forming derivatives of diols include acetylated forms and alkali metal salts of the above diols.

These aromatic dicarboxylic acids, diols and derivatives thereof may be used singly or two or more may be used together.

In particular, the following may be suitably used as component (II a1): high-melting crystalline polymer segments composed of polybutylene terephthalate units derived from terephthalic acid and/or dimethyl terephthalate together with 1,4-butanediol; high-melting crystalline polymer segments composed of polybutylene terephthalate units derived from isophthalic acid and/or dimethyl isophthalate together with 1,4-butanediol; and copolymers of both.

The low-melting polymer segment serving as component (II-a2) is an aliphatic polyether and/or an aliphatic polyester.

Examples of the aliphatic polyether include poly(ethylene oxide) glycol, poly(propylene oxide) glycol, poly(tetramethylene oxide) glycol, poly(hexamethylene oxide) glycol, copolymers of ethylene oxide and propylene oxide, ethylene oxide addition polymers of poly(propylene oxide) glycol, and copolymer glycols of ethylene oxide and tetrahydrofuran. Examples of aliphatic polyesters include poly(ε-caprolactone), polyenantholactone, polycaprolactone, polybutylene adipate and polyethylene adipate. In this invention, from the standpoint of the elastic properties, suitable use can be made of poly(tetramethylene oxide) glycol, ethylene oxide adducts of poly(propylene oxide) glycol, copolymer glycols of ethylene oxide and tetrahydrofuran, poly(ε-caprolactone), polybutylene adipate and polyethylene adipate. Of these, the use of, in particular, poly(tetramethylene oxide) glycol, ethylene oxide adducts of poly(propylene oxide) glycol and copolymer glycols of ethylene oxide and tetrahydrofuran is recommended. The number-average molecular weight of these segments in the copolymerized state is preferably from about 300 to about 6,000.

Component (II-a) can be produced by a known method. Specifically, use can be made of, for example, the method of carrying out a transesterification reaction on a lower alcohol diester of a dicarboxylic acid, an excess amount of a low-molecular-weight glycol and a low-melting polymer segment component in the presence of a catalyst and polycondensing the resulting reaction product, or the method of carrying out an esterification reaction on a dicarboxylic acid, an excess amount of glycol and a low-melting polymer segment component in the presence of a catalyst and polycondensing the resulting reaction product.

The proportion of component (II-a) accounted for by component (II-a2) is from to 60 wt %. The preferred lower limit in this case can be set to 35 wt % or more, and the preferred upper limit can be set to 55 wt % or less. When the proportion of component (II-a2) is too low, the impact resistance (especially at low temperatures) and the compatibility may be inadequate. On the other hand, when the proportion of component (II-a2) is too high, the rigidity of the resin composition (and the molded body) may be inadequate.

The rigid resin serving as component (II-b) is not particularly limited. For example, one or more selected from the group consisting of polycarbonates, acrylic resins, styrene resins such as ABS resins and polystyrenes, polyester resins, polyamide resins, polyvinyl chlorides and modified polyphenylene ethers may be used. In this invention, from the standpoint of compatibility, a polyester resin may be suitably used. More preferably, the use of polybutylene terephthalate and/or polybutylene naphthalate is recommended.

Component (II-a) and component (II-b) are blended in a ratio, expressed as (II-a):(II-b), which is not particularly limited, although this ratio by weight is preferably set to from 50:50 to 90:10, and more preferably from 55:45 to 80:20. When the proportion of component (II-a) is too low, the low-temperature impact resistance may be inadequate. On the other hand, when the proportion of (II-a) is too high, the rigidity of the composition (and the molded body), as well as the molding processability, may be inadequate.

A commercial product may be used as the thermoplastic polyester elastomer (II). Specific examples include those available as Hytrel® from DuPont-Toray Co. Ltd.

Component (II) has a material hardness on the Shore D hardness scale which, to enhance the spin rate on approach shots, is preferably 45 or less, more preferably 43 or less, and even more preferably 41 or less. The lower limit is a Shore D hardness of preferably at least 36, and more preferably at least 38.

Component (II) has a rebound resilience which, to lower the initial velocity on approach shots, is preferably not more than 74%, more preferably not more than 73%, and even more preferably not more than 72%. The lower limit of this rebound resilience is preferably at least 50%, more preferably at least 52%, and even more preferably at least 60%. The rebound resilience is measured in accordance with JIS-K 6255: 2013.

The thermoplastic polyester elastomer serving as component (II) has a melt viscosity of $1.5 \times 10^4$ dPa·s or less, preferably $1.45 \times 10^4$ dPa·s or less, and more preferably $1.0 \times 10^4$ dPa·s or less. The lower limit is preferably at least $0.4 \times 10^4$ dPa·s, and more preferably at least $0.5 \times 10^4$ dPa·s. With this melt viscosity, hardenability after molding of the resin composition is imparted and a good moldability (productivity) can be maintained. This melt viscosity indicates the value measured with a capillary viscometer at a temperature of 200° C. and a shear rate of 243 sec$^{-1}$ in accordance with ISO 11443: 1995.

The amount of component (II) included per 100 parts by weight of component (I) is 20 parts by weight or less, and preferably 15 parts by weight or less. At above this value, a decrease in the scuff resistance may occur. The lower limit in the amount of component (II) included per 100 parts by weight of component (I) is preferably at least 3 parts by weight, and more preferably at least 5 parts by weight.

(III) Aromatic Vinyl Elastomer

Next, the aromatic vinyl elastomer (III) is described.

By using the aromatic vinyl elastomer (III) together with above component (II), a higher spin rate on approach shots can be obtained than in conventional golf balls, enabling the controllability to be sufficiently increased. Also, by including a small amount of aromatic vinyl elastomer (III) at or below a given level as subsequently described, the compatibility with component (I) serving as the base resin is good and the compatibility with the thermoplastic polyester elastomer serving as component (II) is also good, enabling a good scuff resistance and a good moldability to be maintained in the golf ball and in the method for producing the golf ball.

The aromatic vinyl elastomer is a polymer (elastomer) composed of polymer blocks made up primarily of an aromatic vinyl compound, and random copolymer blocks made up of an aromatic vinyl compound and a conjugated diene compound. That is, the aromatic vinyl elastomer generally has, as exemplified by SEBS, blocks made up of an aromatic vinyl compound component that are located at both ends of the polymer and serve as hard segments, and intermediate blocks made up of a conjugated diene compound component that are located between the ends and serve as soft segments. Polymers in which an aromatic vinyl-based component has been randomly introduced into the conjugated diene compound component that makes up the intermediate blocks have also been reported in recent research. The hardness of the aromatic vinyl elastomer generally becomes lower as the content of the aromatic vinyl that forms the hard segments decreases; at the same time, because the amount of the soft segment component increases, the rebound resilience rises. On the other hand, in cases where an aromatic vinyl component is randomly introduced into the soft segments serving as the intermediate blocks, the rebound resilience decreases with little if any rise in the hardness. A similar effect can be obtained by using a conjugated diene compound having a high glass transition temperature (Tg) in place of the aromatic vinyl compound that is randomly introduced into the intermediate blocks. In the present invention, to fully exhibit the above working effects, it is particularly desirable to use the above polymer (elastomer) in a hydrogenated form.

Examples of the aromatic vinyl compound in the polymer include styrene, α-methylstyrene, p-methylstyrene, divinylbenzene, 1,1-diphenylethylene, N,N-dimethyl-p-aminoethylstyrene and N,N-diethyl-p-aminoethylstyrene. These may be used singly or two or more may be used together. Of these aromatic vinyl compounds, styrene is preferred.

Examples of the conjugated diene compound in the polymer include butadiene, isoprene, 2,3-dimethyl-1,3-butadiene, 1,3-pentadiene, 2-methyl-1,3-pentadiene and 1,3-hexadiene. These may be used singly or two or more may be used together. Of these compounds, butadiene and isoprene are preferred. Butadiene is more preferred.

Units originating from the above conjugated diene compounds, such as units originating from butadiene, become ethylene units or butylene units when subjected to hydrogenation. For example, when a styrene-butadiene-styrene block copolymer (SBS) is hydrogenated, it becomes a styrene-ethylene/butylene-styrene block copolymer (SEBS).

As mentioned above, it is preferable for the aromatic vinyl elastomer used as component (III) to be one that has been hydrogenated; i.e., a hydrogenated aromatic vinyl elastomer. The hydrogenated aromatic vinyl elastomer is preferably an elastomer obtained by hydrogenating a polymer composed of polymer blocks made up primarily of an aromatic vinyl compound and random copolymer blocks made up of an aromatic vinyl compound and a conjugated diene compound; and more preferably an elastomer obtained by hydrogenating a polymer composed up of polymer blocks made up primarily of styrene and random copolymer blocks made up of styrene and butadiene. An elastomer obtained by hydrogenating a polymer composed of polymer blocks made up primarily of styrene and random copolymer blocks made up of styrene and butadiene, particularly a polymer having at both ends a polymer block made up primarily of styrene (in particular, one having at each of the two ends a polymer block consisting entirely of styrene) and having random copolymer blocks in between, is especially preferred. It is thought that a lower hardness and a lower resilience are both achieved by using a copolymer having this structure. In addition, the rate of solidification after molding is rapid and so the degree of tack is low. Also, the compatibility with (I) the polyurethane or polyurea serving as the base resin is excellent, enabling decreases in the physical properties owing to such blending to be held to a minimum.

Illustrative examples of the hydrogenated aromatic vinyl elastomer include styrene-ethylene/butylene-styrene block copolymers (SEBS), styrene-isobutylene-styrene block copolymers (SIBS), styrene-isoprene-styrene block copolymers (SIS), styrene-isobutylene block copolymers (SIB), styrene-ethylene/propylene-styrene block copolymers (SEPS), styrene-ethylene/ethylene/propylene-styrene block copolymers (SEEPS), styrene-butadiene/butylene-styrene block copolymers (SBBS) and styrene-ethylene-propylene block copolymers (SEP).

In the aromatic vinyl elastomer, the proportion of the copolymer accounted for by units originating from the aromatic vinyl compound (i.e., the aromatic vinyl compound content, preferably the styrene content) is preferably at least 30 wt %, more preferably at least 40 wt %, even more preferably at least 50 wt %, and most preferably at least 60 wt %. By thus setting the aromatic vinyl compound content, preferably the styrene content, to a high level, the compatibility with the polyurethane or polyurea serving as component (I) is good and, moreover, the desired hardness and moldability can be prevented from worsening. The content of units from the above aromatic vinyl compound (preferably the styrene content) can be determined by calculation from $H^1$-NMR measurements.

In the aromatic vinyl elastomer, the glass transition temperature (Tg), as indicated by the tan δ peak temperature obtained by dynamic viscoelasticity measurement with a dynamic mechanical analyzer (DMA), is preferably from −20 to 50° C., more preferably at least 0° C., and even more preferably at least 5° C. The thinking here is that, by having the tan δ peak temperature be close to the temperature at which the golf ball is generally used, the rebound resilience of the overall resin composition is kept low in the temperature region at which the golf ball is generally used, enabling the desired effects of the invention to be increased.

A commercial product may be used as the aromatic vinyl elastomer serving as component (III). Examples of such commercial products include those available under the trademarks S.O.E., TUFTEC and TUFPREN from Asahi Kasei Corporation, and those available under the trade name DICSTYRENE from DIC Corporation.

Component (III) has a material hardness on the Shore D hardness scale which, to increase the spin rate on approach shots, is 30 or less, preferably 28 or less, and more preferably 26 or less. The lower limit is preferably at least 18, and more preferably at least 20.

Component (III) has a rebound resilience which, to maintain the spin rate of the ball on approach shots and keep the ball rebound on approach shots low so as achieve good controllability, is 30% or less, preferably 25% or less, and more preferably 22% or less. By thus keeping the rebound resilience very low, a small amount of addition will not have an adverse effect on the golf ball properties, enabling a decrease in the ball initial velocity on approach shots to be achieved. To minimize the decrease in rebound and the reduction in distance on shots with a driver, the lower limit of the rebound resilience is preferably at JIS-K 6255: 2013.

The content of component (III) per 100 parts by weight of component (I) is 30 parts by weight or less, preferably 20 parts by weight or less, more preferably 15 parts by weight or less, and even more preferably 10 parts by weight or less. The lower limit in this content is preferably at least 0.1 part by weight, more preferably at least 0.2 part by weight, and even more preferably at least 0.5 part by weight. When the content of component (III) is too high, the scuff resistance and moldability may worsen. On the other hand, when the content of component (III) is too low, the low hardness and the desired rebound resilience as a cover resin material may not be obtained, and the ball initial velocity lowering effect on approach shots may diminish.

In addition to the above resin components, other resin materials may be included in the resin composition containing components (I) to (III). The purposes for doing so are, for example, to further improve the flowability of the golf ball resin composition and to increase such ball properties as the rebound and the durability to cracking.

Specific examples of other resin materials that may be used include polyamide elastomers, ionomer resins, ethylene-ethylene/butylene-ethylene block copolymers and modified forms thereof, polyacetals, polyethylenes, nylon resins, methacrylic resins, polyvinyl chlorides, polycarbonates, polyphenylene ethers, polyarylates, polysulfones, polyethersulfones, polyetherimides and polyamideimides. These may be used singly or two or more may be used together.

In addition, an active isocyanate compound may be included in the above resin composition. This active isocyanate compound reacts with the polyurethane or polyurea serving as the base resin, enabling the scuff resistance of the overall resin composition to be further enhanced. Moreover, the isocyanate has a plasticizing effect which increases the flowability of the resin composition, enabling the moldability to be improved.

Any isocyanate compound employed in conventional polyurethanes may be used without particular limitation as the above isocyanate compound. For example, aromatic isocyanate compounds that may be used include 2,4-toluene diisocyanate, 2,6-toluene diisocyanate and mixtures of both, 4,4-diphenylmethane diisocyanate, m-phenylene diisocyanate and 4,4'-biphenyl diisocyanate. Use can also be made of the hydrogenated forms of these aromatic isocyanate compounds, such as dicyclohexylmethane diisocyanate. Other isocyanate compounds that may be used include aliphatic diisocyanates such as tetramethylene diisocyanate, hexamethylene diisocyanate (HDI) and octamethylene diisocyanate; and alicyclic diisocyanates such as xylene diisocyanate. Further examples of isocyanate compounds that may be used include blocked isocyanate compounds obtained by reacting the isocyanate groups on a compound having two or more isocyanate groups on the ends with a compound having active hydrogens, and uretdiones obtained by the dimerization of isocyanate.

The amount of the above isocyanate compounds included per 100 parts by weight of the polyurethane or polyurea serving as the base resin is preferably at least 0.1 part by weight, and more preferably at least 0.5 part by weight. The upper limit is preferably not more than 30 parts by weight, and more preferably not more than 20 parts by weight. When too little is included, a sufficient crosslinking reaction may not be obtained and an improvement in the properties may not be observable. On the other hand, when too much is included, discoloration over time due to heat and ultraviolet light may increase, or problems such as a loss of thermoplasticity or a decline in resilience may arise.

In addition, optional additives may be suitably included in the above resin composition according to the intended use thereof. For example, when the golf ball resin composition is to be used as a cover material, various additives, such as inorganic fillers, organic staple fibers, reinforcing agents, crosslinking agents, pigments, dispersants, antioxidants, ultraviolet absorbers and light stabilizers, may be added to the ingredients described above. When such additives are included, the amount thereof per 100 parts by weight of the base resin is preferably at least 0.1 part by weight, and more preferably at least 0.5 part by weight, but preferably not more than 10 parts by weight, and more preferably not more than 4 parts by weight.

The resin composition has a rebound resilience measured in accordance with JIS-K 6255: 2013 which, in order to increase the spin rate on approach shots, is preferably at least 50%, more preferably at least 52%, and even more preferably at least 54%. The upper limit is preferably 72% or less, more preferably 70% or less, and even more preferably 68% or less.

The resin composition has a material hardness on the Shore D hardness scale which, in order to increase the spin rate on approach shots, is preferably 49 or less, more preferably 48 or less, and even more preferably 47 or less. From the standpoint of moldability, the lower limit in the material hardness on the Shore D hardness scale is preferably at least 30, and more preferably at least 35.

The above resin composition may be prepared by mixing together the ingredients using any of various types of mixers, such as a kneading-type single-screw or twin-screw extruder, a Banbury mixer, a kneader or a Labo Plastomill. Alternatively, the ingredients may be mixed together by dry blending at the time that the resin composition is to be injection-molded. In addition, when an active isocyanate compound is used, it may be incorporated at the time of resin mixture using various types of mixers, or a resin masterbatch already containing the active isocyanate compound and other ingredients may be separately prepared and the various components mixed together by dry blending at the time that the resin composition is to be injection-molded.

The method of molding the cover from the above resin composition may involve, for example, feeding the resin composition into an injection molding machine and molding the cover by injecting the molten resin composition over the core. In this case, the molding temperature differs according to the type of polyurethane or polyurea (I) serving as the base resin, but is typically in the range of 150 to 270° C.

The cover has a thickness of preferably at least 0.4 mm, more preferably at least 0.5 mm, and even more preferably at least 0.6 mm. The upper limit is preferably not more than 3.0 mm, and more preferably not more than 2.0 mm.

In cases where an intermediate layer is interposed between the above core and the above cover, it is preferable to employ any of various types of thermoplastic resins used in golf ball cover materials, especially an ionomer resin, as the intermediate layer material. A commercial product may be used as the ionomer resin. In this case, the thickness of the intermediate layer may be set within a similar range as the thickness of the cover described above.

In the golf ball of the invention, for reasons having to do with the aerodynamic performance, numerous dimples are provided on the surface of the outermost layer. The number of dimples formed on the surface of the outermost layer is not particularly limited. However, to enhance the aerodynamic performance and increase the distance traveled by the ball, this number is preferably at least 250, more preferably at least 270, even more preferably at least 290, and most preferably at least 300. The upper limit is preferably not more than 400, more preferably not more than 380, and even more preferably not more than 360.

In this invention, a coating layer is formed on the cover surface. A two-part curable urethane coating may be suitably used as the coating that forms this coating layer. Specifically, in this case, the two-part curable urethane coating is one that includes a base resin composed primarily of a polyol resin and a curing agent composed primarily of a polyisocyanate.

A known method may be used without particular limitation as the method for applying this coating onto the cover surface and forming a coating layer. Use can be made of a desired method such as air gun painting or electrostatic painting.

The thickness of the coating layer, although not particularly limited, is typically from 8 to 22 µm, and preferably from 10 to 20 µm.

The golf ball of the invention can be made to conform to the Rules of Golf for play. The inventive ball may be formed to a diameter which is such that the ball does not pass through a ring having an inner diameter of 42.672 mm and is not more than 42.80 mm, and to a weight which is preferably between 45.0 and 45.93 g.

EXAMPLES

The following Examples and Comparative Examples are provided to illustrate the invention, and are not intended to limit the scope thereof.

Examples 1 to 12, Comparative Examples 1 to 6

Common Core

A core-forming rubber composition formulated as shown in Table 1 and common to all of the Examples is prepared and then molded and vulcanized to produce a 38.6 mm diameter core.

TABLE 1

| Rubber composition | parts by weight |
| --- | --- |
| cis-1,4-Polybutadiene | 100 |
| Zinc acrylate | 27 |
| Zinc oxide | 4.0 |
| Barium sulfate | 16.5 |
| Antioxidant | 0.2 |
| Organic peroxide (1) | 0.6 |
| Organic peroxide (2) | 1.2 |
| Zinc salt of pentachlorothiophenol | 0.3 |
| Zinc stearate | 1.0 |

Details on the above core material are given below.
Cis-1,4-Polybutadiene: Available under the trade name "BR 01" from JSR Corporation
Zinc acrylate: Available from Nippon Shokubai Co., Ltd.
Zinc oxide: Available from Sakai Chemical Co., Ltd.
Barium sulfate: Available from Sakai Chemical Co., Ltd.
Antioxidant: Available under the trade name "Nocrac NS6" from Ouchi Shinko Chemical Industry Co., Ltd.
Organic peroxide (1): Dicumyl peroxide, available under the trade name "Percumyl D" from NOF Corporation
Organic peroxide (2): A mixture of 1,1-di(tert-butylperoxy) cyclohexane and silica, available under the trade name "Perhexa C-40" from NOF Corporation
Zinc stearate: Available from NOF Corporation Common Intermediate Layer The intermediate layer-forming resin material was injected-molded over the 38.6 mm diameter core, thereby producing an intermediate layer-encased sphere having an intermediate layer with a thickness of 1.25 mm. This intermediate layer-forming resin material, which has a resin formulation common to all of the Examples, is a blend of 50 parts by weight of a sodium-neutralized ethylene-unsaturated carboxylic acid copolymer having an acid content of 18 wt % and 50 parts by weight of a zinc-neutralized ethylene-unsaturated carboxylic acid copolymer having an acid content of 15 wt % (for a combined amount of 100 parts by weight).

Cover (Outermost Layer)

Next, in Examples 3, 4, 8, 10 and 11 and in Comparative Examples 1, 2, 3, 5 and 6, the cover materials for the outermost layer shown in Table 2 below were injection-molded over the intermediate layer-encased spheres, thereby producing 42.7 mm diameter three-piece golf balls having an outermost layer with a thickness of 0.8 mm. Dimples common to all of the Examples and Comparative Examples were formed on the surface of the cover. The cover-forming resin composition was designed such that the various ingredients are included in the amounts shown in Table 2 below, and was injection-molded at a molding temperature of between 200 and 250° C.

In Examples 1, 2, 5 to 7, 9 and 12 and in Comparative Example 4, a three-piece golf ball is produced in the same way as described above.

Details on the ingredients included in the compositions in Table 2 are given below.

TPU 1: An ether-type thermoplastic polyurethane available from DIC Covestro Polymer, Ltd. under the trade name "Pandex" (Shore D hardness, 43; rebound resilience, 61%)

TPU 2: An ether-type thermoplastic polyurethane available from DIC Covestro Polymer, Ltd. under the trade name "Pandex" (Shore D hardness, 47; rebound resilience, 54%)

Polyester Elastomer 1:
A thermoplastic polyether ester elastomer (Shore D hardness, 40) available from DuPont-Toray Co., Ltd. under the trade name Hytrel® 2401

Polyester Elastomer 2:
A 29:1 mixture by weight of Hytrel® 4001 and Hytrel® 2401, both available under these trade names from DuPont-Toray Co., Ltd.

Polyester Elastomer 3:
A thermoplastic polyether ester elastomer (Shore D hardness, 31) available from DuPont-Toray Co., Ltd. under the trade name Hytrel® 3001

Polyester Elastomer 4:
A thermoplastic polyether ester elastomer (Shore D hardness, 55) available from DuPont-Toray Co., Ltd.

Polyester Elastomer 5:
A thermoplastic polyether ester elastomer (Shore D hardness, 37) available from DuPont-Toray Co., Ltd. under the trade name Hytrel® 4001

Hydrogenated Aromatic Vinyl Elastomer:
A styrene-ethylene/butylene-styrene block copolymer (SEBS) available under the trade name S.O.E. 51611 from Asahi Kasei Corporation (styrene content, 60 wt %; Shore D hardness, 23; rebound resilience, 20%)

Properties of Resin Compositions (1) Rebound Resilience:
The rebound resiliences of the resin compositions measured in accordance with JIS-K 6255: 2013 are shown in Table 2.

(2) Melt Viscosity:
The melt viscosities of the resin compositions measured with a capillary rheometer at 200° C. and a shear rate of 243 sec$^{-1}$ in accordance with ISO 11443: 1995 are shown in Tables 2 and 3.

The spin performance on approach shots, initial velocity performance, scuff resistance, controllability and moldability of each of the golf balls are evaluated by the methods described below. The results are shown in Tables 2 and 3.

Initial Velocity and Spin Performance on Approach Shots

A sand wedge (SW) is mounted on a golf swing robot and the initial velocity and backspin rate of the ball immediately after being struck at a head speed (HS) of 20 m/s are measured with a launch monitor.

Controllability

Sensory evaluations of the controllability of the ball on approach shots were carried out by the following method. The club used was a sand wedge (SW) similar to that mentioned above (product name, Bridgestone Tourstage TW-03; loft angle, 57°). The controllability was judged based the following criteria when actually hit by golfers.

Excellent (Exc): Outstanding controllability

Good: Good controllability

Fair: Somewhat poor controllability

NG: Poor controllability

In addition to the spin rate of the ball, the length of the contact time between the ball and the clubface arising from the low ball rebound also affects the judgment as to whether the controllability is good. When the contact time is long, the controllability is good; when it is short, the controllability worsens. What is being determined here is the controllability, which includes as factors the spin rate and the length of the contact time.

Evaluation of Scuff Resistance

The golf balls are held isothermally at 23° C. and five balls of each type are hit at a head speed of 33 m/s using as the club a pitching wedge (PW) mounted on a swing robot machine. The damage to the ball from the impact is visually evaluated according to the following criteria.

Good: Slight scuffing or substantially no apparent scuffing

Fair: Slight fraying of surface or slight dimple damage

NG: Dimples completely obliterated in places

Evaluation of Moldability (Mold Releasability)

Releasability of the ball from the mold following injection molding of the cover is evaluated according to the following criteria for the balls in each Example.

Excellent (Exc): External defects such as runner stubs and ejector pin marks do not arise during demolding Good: External defects such as rubber stubs and ejector pin marks arise during demolding, but not to such a degree as to affect molding NG: External defects such as runner stubs and ejector pin marks arise during demolding, making molding impossible

TABLE 2

| | | | Example | | | | | |
|---|---|---|---|---|---|---|---|---|
| | | | 1 | 2 | 3 | 4 | 5 | 6 |
| Cover Composition (pbw) | (I) | TPU 1 | 100 | 100 | 100 | 100 | 100 | 100 |
| | (II) | Polyester Elastomer 1 | 5 | 10 | 14.5 | 0 | 5 | 10 |
| | (II) | Polyester Elastomer 2 | | | | 15 | | |
| | (II) | Polyester Elastomer 3 | | | | | | |
| | (II) | Polyester Elastomer 4 | | | | | | |
| | (II) | Polyester Elastomer 5 | | | | | | |
| | (III) | Hydrogenated aromatic vinyl elastomer | 0.5 | 0.5 | 0.5 | 0.5 | 5 | 5 |
| Properties of ingredients | | Melt viscosity ($\times 10^4$ dPa·s) of component (II) | 0.57 | 0.57 | 0.57 | 1.26 | 0.57 | 0.57 |
| | | Hardness of component (II) (Shore D) | 40 | 40 | 40 | 37 | 40 | 40 |
| | | Rebound resilience of component (II) (%) | 67 | 67 | 67 | 73 | 67 | 67 |
| | | Hardness of component (III) (Shore D) | 23 | 23 | 23 | 23 | 23 | 23 |
| | | Rebound resilience of component (III) (%) | 21 | 21 | 21 | 21 | 21 | 21 |
| Evaluation results | | Spin rate on approach shots (rpm) | 6,393 | 6,386 | 6,382 | 6,404 | 6,355 | 6,348 |
| | | Initial velocity on approach shots (m/s) | 19.36 | 19.35 | 19.34 | 19.38 | 19.33 | 19.32 |
| | | Controllability on approach shots | good | good | good | good | Exc | Exc |
| | | Scuff resistance | good | good | good | good | good | good |
| | | Moldability | Exc | Exc | Exc | good | Exc | Exc |

| | | | Example | | Comparative Example | | | |
|---|---|---|---|---|---|---|---|---|
| | | | 7 | 8 | 1 | 2 | 3 | 4 |
| Cover Composition (pbw) | (I) | TPU 1 | 100 | 100 | 100 | 100 | 100 | 100 |
| | (II) | Polyester Elastomer 1 | 14.5 | | | | 14.5 | |
| | (II) | Polyester Elastomer 2 | | | | | | |
| | (II) | Polyester Elastomer 3 | | | | 14.5 | | |
| | (II) | Polyester Elastomer 4 | | | | | | 14.5 |
| | (II) | Polyester Elastomer 5 | | 14.5 | | | | |
| | (III) | Hydrogenated aromatic vinyl elastomer | 5 | 0.5 | 0.5 | 0.5 | 25 | 0.5 |
| Properties of ingredients | | Melt viscosity ($\times 10^4$ dPa·s) of component (II) | 0.57 | 1.28 | — | 0.45 | 0.57 | 3.38 |
| | | Hardness of component (II) (Shore D) | 40 | 37 | — | 30 | 40 | 55 |
| | | Rebound resilience of component (II) (%) | 67 | 73 | — | 75 | 67 | 50 |
| | | Hardness of component (III) (Shore D) | 23 | 23 | 23 | 23 | 23 | 23 |

TABLE 2-continued

|  |  | | | | | | |
|---|---|---|---|---|---|---|---|
| Evaluation results | Rebound resilience of component (III) (%) | 21 | 21 | 21 | 21 | 21 | 21 |
|  | Spin rate on approach shots (rpm) | 6,344 | 6,414 | 6,393 | 6,466 | 6,393 | 6,392 |
|  | Initial velocity on approach shots (m/s) | 19.31 | 19.38 | 19.37 | 19.39 | 19.37 | 19.34 |
|  | Controllability on approach shots | Exc | Exc | NG | NG | good | good |
|  | Scuff resistance | good | good | good | good | NG | NG |
|  | Moldability | Exc | Exc | good | good | NG | NG |

TABLE 3

|  |  |  | Example | | | | Comparative Example | |
|---|---|---|---|---|---|---|---|---|
|  |  |  | 9 | 10 | 11 | 12 | 5 | 6 |
| Cover Composition (pbw) | (I) | TPU 2 | 100 | 100 | 100 | 100 | 100 | 100 |
|  | (II) | Polyester Elastomer 1 | 5 | 5 | 5 | 14.5 | 0 | 0 |
|  | (II) | Polyester Elastomer 2 |  |  |  |  |  |  |
|  | (II) | Polyester Elastomer 3 |  |  |  |  |  |  |
|  | (II) | Polyester Elastomer 4 |  |  |  |  |  |  |
|  | (II) | Polyester Elastomer 5 |  |  |  |  |  |  |
|  | (III) | Hydrogenated aromatic vinyl elastomer | 5 | 10 | 15 | 5 | 5 | 0 |
| Properties of ingredients | Melt viscosity ($\times 10^4$ dPa·s) of component (II) | | 0.57 | 0.57 | 0.57 | 0.57 | — | — |
|  | Hardness of component (II) (Shore D) | | 40 | 40 | 40 | 40 | — | — |
|  | Rebound resilience of component (II) (%) | | 67 | 67 | 67 | 67 | — | — |
|  | Hardness of component (III) (Shore D) | | 23 | 23 | 23 | 23 | 23 | — |
|  | Rebound resilience of component (III) (%) | | 21 | 21 | 21 | 21 | 21 | — |
| Evaluation results | Spin rate on approach shots (rpm) | | 6,296 | 6,255 | 6,220 | 6,231 | 6,151 | 6,192 |
|  | Initial velocity on approach shots (m/s) | | 19.21 | 19.18 | 19.12 | 19.22 | 19.15 | 19.19 |
|  | Controllability on approach shots | | good | good | good | good | fair | NG |
|  | Scuff resistance | | good | good | good | good | good | good |
|  | Moldability | | good | good | good | good | good | good |

As demonstrated by the results in Table 2, the golf balls obtained in of Comparative Examples 1 to 6 are inferior in the following respects to the golf balls obtained in Examples 1 to 8 according to the present invention.

In Comparative Example 1, component (II) is not included in the resin composition. As a result, the controllability of the ball on approach shots is poor.

In Comparative Example 2, the rebound resilience of component (II) of the resin composition is higher than the specified range. As a result, the controllability of the ball on approach shots is poor.

In Comparative Example 3, the amount of component (III) included in the resin composition is high. As a result, both the scuff resistance and moldability are poor.

In Comparative Example 4, the melt viscosity of component (II) in the resin composition is high and the material hardness is high. As a result, both the scuff resistance and moldability are poor.

In Comparative Example 5, component (II) is not included in the resin composition. As a result, the controllability of the ball on approach shots is poor.

In Comparative Example 6, both component (II) and component (III) are not included in the resin composition. As a result, the controllability of the ball on approach shots is poor.

Japanese Patent Application No. 2021-095656 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a rubber core of at least one layer and a cover of at least one layer encasing the core, wherein at least one layer of the cover is formed of a resin composition comprising:
   (I) a polyurethane or a polyurea,
   (II) a thermoplastic polyester elastomer, and
   (III) an aromatic vinyl elastomer;
   the thermoplastic polyester elastomer serving as component (II) having a Shore D hardness of 45 or less, a rebound resilience of from 50 to 72%, a melt viscosity at 200° C. and a shear rate of 243 $\sec^{-1}$ of $1.0 \times 10^4$ dPa·s or less, and being included in an amount of 20 parts by weight or less per 100 parts by weight of component (I); and the aromatic vinyl elastomer serving as component (III) having a Shore D hardness of 30 or less and a rebound resilience of 30% or less, and being included in an amount of 20 parts by weight or less per 100 parts by weight of component (I).

2. The golf ball of claim 1, wherein component (II) is included in an amount of 15 parts by weight or less per 100 parts by weight of component (I).

3. The golf ball of claim 1, wherein component (III) is included in an amount of 15 parts by weight or less per 100 parts by weight of component (I).

4. The golf ball of claim 1, wherein component (III) is a hydrogenated aromatic vinyl elastomer.

5. The golf ball of claim 1, wherein component (III) is an elastomer obtained by hydrogenating a polymer composed of polymer blocks made up primarily of an aromatic vinyl compound and random copolymer blocks made up of an aromatic vinyl compound and a conjugated diene compound.

6. The golf ball of claim 1, wherein component (III) is a hydrogenated aromatic vinyl elastomer obtained by hydrogenating a polymer which is composed of polymer blocks made up of styrene and random copolymer blocks made up of styrene and butadiene, the polymer blocks made up of styrene being located at both ends of the polymer and the random copolymer blocks being located in between.

7. The golf ball of claim 1, wherein the amount of component (II) per 100 parts by weight of component (I) is from 5 to 20 parts by weight and the amount of component (III) per 100 parts by weight of component (I) is from 0.1 to 5 parts by weight.

* * * * *